United States Patent Office 2,994,587
Patented Aug. 1, 1961

2,994,587
PREPARATION OF HYDRIDES OF MAGNESIUM AND BERYLLIUM
Donald W. Vose, Beverly, Mass., assignor to Metal Hydrides Incorporated, Beverly, Mass., a corporation of Massachusetts
No Drawing. Continuation of application Ser. No. 695,208, Nov. 8, 1957. This application June 13, 1958, Ser. No. 741,750
8 Claims. (Cl. 23—204)

This invention relates to the preparation of hydrides of magnesium and beryllium by reacting the respective metals with hydrogen.

Calcium, barium and strontium are readily and completely hydrided by direct action with hydrogen by heating these metals in hydrogen under a hydrogen pressure of one atmosphere. In fact, when calcium metal is heated to about 400° C. in the presence of hydrogen, a highly exothermic reaction sets in and precautions must be taken to prevent the temperature rising above the melting point of the calcum metal. On the other hand, magnesium and beryllium do not react with hydrogen under similar conditions. This difference is so great that the alkaline earth metals are divided into two categories on this basis in a recent treatise by D. T. Hurd entitled "Chemistry of the Hydrides."

C. Winkler, Ber., 24, 1966–84 (1891) observed very limited reaction between hydrogen and either magnesium or beryllium, and incomplete hydriding has been observed in several instances since. For example, C. E. Holley, Jr., and J. F. Lemons, Los Alamos Scientific Laboratory Report, LA–1660 (1954), obtained a product containing 65 percent magnesium hydride by hydriding doubly distilled fine magnesium turnings with purified hydrogen at 1250–1300 p.s.i. at a temperature between 590 and 605° C. for 33 hours. Under a variety of other conditions employing hydrogen pressures up to 2080 p.s.i. and temperatures up to 705° C., the same workers obtained conversions ranging from 10 to 45 percent. E. Wiberg, H. Goeltzer and R. Bauer, Z. Naturforsch, 6b, 394 (1951), reported a 60 percent conversion by hydriding magnesium under high hydrogen pressure (200 atm.) at 570° C. in the presence of a magnesium iodide catalyst.

The present invention provides a low cost method for preparing finely divided powders of magnesium hydride and beryllium hydride of high purity and in high yield by reacting the respective metals with hydrogen. The particle size of the powder as determined by microscopic examination is in the range from 1 to about 100 microns with an average diameter of about 5 microns. A typical particle size by screen analysis is 6 percent of minus 100 plus 200 mesh, 31 percent of minus 200 plus 325 mesh and 63 percent minus 325 mesh.

In accordance with the method of the invention, magnesium metal or beryllium metal is comminuted, as by chipping, turning, grinding or atomizing, to form pieces of a size substantially larger than the particle size of the final metal hydride powder. The comminuted material then is subjected to the action of hydrogen at a pressure between about 200 and 1000 pounds per square inch while heated at a temperature between about 230° C. and about 450° C. until the metal has absorbed sufficient hydrogen to embrittle and permit it to be pulverized. Higher temperatures and higher hydrogen pressures may be used if desired but the above stated temperatures and pressures are presently preferred. This step introduces from about 10 to 80 percent of the hydrogen equivalent to the metal hydride and usually requires about 2 to 3 hours. This partially hydrided material is pulverized to substantially the particle size of the final desired metal hydride powder and is subjected to the action of hydrogen at a pressure between about 200 and 1000 pounds per square inch while heated at a temperature between about 230° C. and about 450° C. until substantially all the metal has been converted to hydride. Higher temperatures and higher hydrogen pressures may be used if desired. The latter hydriding step is essentially complete in a few minutes.

The method of the invention is adapted for the continuous or semi-continuous production of magnesium hydride and beryllium hydride. Thus, chips of the metal or other form of comminuted metal may be fed continuously to a ball mill reactor or other suitable reactor heated to a temperature between about 230° C. to 450° C. and containing hydrogen maintained at a pressure in the range of 200 to 1000 pounds per square inch, the reactor being constructed and operated so that the solid material is moved from one end to the other as the reaction proceeds and metal hydride being continuously or intermittently discharged from the latter end of the reactor.

The invention is illustrated further by the following examples.

Example 1

In this example chunks of magnesium metal purchased on the open market and known as "Reade Magnesium #60" were used. These chunks appeared to have been comminuted by grinding and were 10 percent minus 40 plus 60 mesh, and 90 percent minus 60 plus 80 mesh. 400 grams of this material was heated at 400° C. for 2 hours in hydrogen at a pressure of 1000 pounds per square inch. After this step, the material analyzed 58 percent magnesium hydride. This product was discharged from the autoclave and transferred to a 1.5 gallon steel ball mill containing 15 pounds of one half inch steel balls. The product was ball milled for 3 hours to produce a fine black powder which ignited if contacted in water. It was handled throughout in an argon-filled drybox. It then was treated in the autoclave at 300° C. and 1000 p.s.i. of hydrogen for 1 hour. This stage of the reaction was essentially complete in 3 to 4 minutes. This was demonstrated by the temperature rise caused by the exothermic reaction and observed on a recording potentiometer and noting the pressure drop in the system by means of a recording pressure gauge. The material so prepared analyzed 96.9 percent magnesium hydride by hydrogen evolution from acidified water.

Example 2

Magnesium turnings, commonly referred to as Grignard magnesium, were used in this example. The turnings measured 3 to 4 sq. mm. with a thickness of about 1/64 of an inch and were 100 percent minus 10 plus 20 mesh. 350 grams of these turnings were loaded into an autoclave and treated for 3 hours at 400° C. under a hydrogen pressure of 1000 p.s.i. The resulting product contained 27 percent of the hydrogen equivalent to magnesium hydride. This material was transferred to a ball mill and ball milled for 5 hours to obtain a fine black powder. The ball mill was opened in an argon-filled drybox and the product loaded into a pressure vessel and treated at 350° C. and 500 p.s.i. of hydrogen for 2 hours. The reaction was essentially complete in 3 to 4 minutes as demonstrated in the same manner as described in Example 1. The product analyzed 95 percent magnesium hydride by hydrogen assay evolved on contact with acidified water.

Example 3

Reade Magnesium #2 chips were used in this example. The chips measured 3 to 6 sq. mm. on the side and had a thickness of 1/64 of an inch. 90 percent of the chips passed through a minus 4 mesh screen. 300 grams of these chips were placed in a high pressure autoclave and hydrided at 450° C. and 500 p.s.i. of hydrogen for 2 hours. The material so treated analyzed 29 percent magnesium hydride. The product was ball milled for 3 hours to obtain a fine powder. The ball mill was opened in an argon-filled drybox and the product re-loaded into the pressure vessel and treated at 400° C. and 500 p.s.i. of hydrogen for 2 hours. The reaction was essentially complete in 3 to 4 minutes. The product assayed 96.9 percent magnesium hydride.

The present application is a continuation of my copending application Serial No. 695,208, filed November 8, 1957, now abandoned.

I claim:

1. The method of preparing a finely divided powder of a hydride of a metal selected from the group consisting of magnesium and beryllium which comprises subjecting the selected metal in the form of pieces having an average particle size substantially greater than the average particle size of said finely divided powder to the action of hydrogen under high pressure while heated at a high temperature until the metal has absorbed between about 10 to 80 percent of the hydrogen equivalent to the metal hydride thereby to embrittle and permit it to be pulverized, pulverizing the embrittled metal, and subjecting the pulverized material to the action of hydrogen under high pressure while heated at a high temperature until substantially all of the selected metal has been converted to metal hydride, the pressure of said hydrogen under high pressure being not less than about 200 pounds per square inch, the temperature used being not less than about 230° C. but less than the dissociation temperature of the hydride of the selected metal.

2. The method as claimed by claim 1 wherein the embrittled metal is pulverized to a particle size within the range of about 1 to about 100 microns.

3. The method as claimed by claim 1 wherein the selected metal is magnesium.

4. The method as claimed by claim 1 wherein the selected metal is beryllium.

5. The method as claimed by claim 2 wherein the selected metal is magnesium.

6. The method as claimed by claim 2 wherein the selected metal is beryllium.

7. The method as claimed by claim 3 wherein the temperature used is between about 230° C. and about 450° C.

8. The method as claimed by claim 5 wherein the temperature used is between about 230° C. and about 450° C.

References Cited in the file of this patent

UNITED STATES PATENTS

| | | |
|---|---|---|
| 2,849,275 | Bleecker | Aug. 26, 1958 |

FOREIGN PATENTS

| | | |
|---|---|---|
| 947,701 | Germany | Aug. 23, 1956 |
| 947,789 | Germany | Aug. 23, 1956 |
| 777,095 | Great Britain | June 19, 1957 |
| 777,096 | Great Britain | June 19, 1957 |